United States Patent [19]

Kronberg

[11] Patent Number: 4,979,397
[45] Date of Patent: Dec. 25, 1990

[54] IN-LINE ROTATING TORQUE SENSOR WITH ON-BOARD AMPLIFIER

[75] Inventor: James W. Kronberg, Beech Island, S.C.

[73] Assignee: The United States of America as represented by the United States Department of Energy, Washington, D.C.

[21] Appl. No.: 365,342

[22] Filed: Jun. 13, 1989

[51] Int. Cl.⁵ .............................................. G01L 3/14
[52] U.S. Cl. ............................. 73/862.19; 73/862.33
[58] Field of Search ............ 73/862.19, 862.33, 862.35, 73/862.36, 862.37, 773, 769, 60, 59

[56] References Cited

U.S. PATENT DOCUMENTS

| | | | |
|---|---|---|---|
| 2,580,395 | 1/1952 | Bellizzi | 73/862.36 |
| 3,200,624 | 8/1965 | Tix | 73/862.36 X |
| 3,298,223 | 1/1967 | Dyer | 73/862.33 |
| 3,664,184 | 5/1972 | Dyer | 73/862.35 |
| 3,824,845 | 7/1974 | Huebner | 73/862.33 X |
| 3,877,300 | 4/1975 | Ginns | 73/862.33 |
| 4,096,743 | 6/1978 | Diamond | 73/862.33 |
| 4,668,096 | 5/1987 | Saaty | 366/142 |
| 4,704,035 | 11/1987 | Kowalczyk | 366/142 |
| 4,723,450 | 2/1988 | Coulter | 73/862.19 |
| 4,724,711 | 2/1988 | Sakakibara et al. | 73/862.33 |
| 4,747,690 | 5/1988 | Hayashi | 366/142 |
| 4,754,652 | 7/1988 | Coulter et al. | 73/862.19 |

FOREIGN PATENT DOCUMENTS

| | | | |
|---|---|---|---|
| 646445 | 8/1962 | Canada | 73/862.37 |
| 1803283 | 6/1970 | Fed. Rep. of Germany | 73/862.35 |

Primary Examiner—Charles A. Ruehl
Attorney, Agent, or Firm—Allen F. Westerdahl; Stephen D. Hamel; William R. Moser

[57] ABSTRACT

A rotating torque sensor apparatus and method for measuring small torques comprising a shaft, a platform having a circuit board and a first moment arm attached to the shaft, a rotatable wheel coaxial with the shaft and having a second moment arm spaced apart from the first moment arm with a load cell therebetween for generating an electric signal as the torque is applied to the shaft and transferred through the moment arms to the load cell. The electrical signal is conducted from the load cell to the circuit board for filtering and amplification before being extracted from the torque assembly through a slip ring.

4 Claims, 5 Drawing Sheets

ADJ
V−
GND
OUT
V+
GAIN

IN-LINE ROTATING TORQUE SENSOR WITH ON-BOARD AMPLIFIER

BACKGROUND OF THE INVENTION

1. Field of the Invention and Contract Statement

The present invention relates to a method and apparatus for measuring very small torques developed along a rotating mechanical assembly.

The United States Government has rights in this invention pursuant to Contract No. DE-AC09-76SR00001 between the U.S. Department of Energy and E. I. DuPont de Nemours & Co.

2. Discussion of Background

Torque in a rotating shaft or mechanical assembly must sometimes be measured to a high degree of accuracy and without introducing significant extraneous force, elastic flexing or mechanical noise. For example, the development of gel strength as a function of time in such diverse products as jam and concrete is monitored by turning a set of blades at constant speed while measuring the resulting torque. Motion must be slow, as any disturbance may interfere with the gelling process; by the same token, vibration must be kept to a minimum. Since the torque developed is typically quite small, extraneous forces which could interfere with the measurement must also be minimized.

Most commonly, torque is measured using load-cell technology. A load cell consists of a section of elastic material which flexes to some degree in response to an applied force. The flexing is measured by one or more attached (or integral) resistive elements which carry an electric current; flexing alters their resistance, producing a small but measurable high-impedance electrical output proportional to the applied force. The majority of torque sensors are simply load cells so constructed that flexing takes place in response to torque, normally exerted between two end shafts or other connection points.

Sensors of this type must be used with caution. Mechanical "give" caused by the flexing motion may delay the attainment of equilibrium, slowing sensor response. Forces other than pure torque may cause extraneous flexing and false readings. Excessive torque (or force) may permanently deform the flexing element or cause the resistive elements to become detached or broken. To minimize these problems, flexing elements are commonly made of strong and stiff materials such as silicon and stainless steel. Since response is proportional to flexing, however, making a device more sensitive also makes it more vulnerable.

Additional complications arise when the sensor is part of a continuously rotating section of an assembly. Continuous rotation makes electrical connection difficult; wires forming a direct connection would quickly be twisted and broken. Alternative connection methods, such as the use of slip rings or electromagnetic coupling of various kinds, have been tried. All of these introduce some degree of error into the readings: slip rings and similar devices cause frictional noise that can obscure the very low-level strain gauge output, and electromagnetic methods increase the complexity and the expense of the circuitry and may have a tendency to drift.

Because of these problems, rotating torque sensors are used only rarely. When there is no alternative to measuring torque on a rotating shaft, differential gearing may be used to reverse the shaft's direction, while a stationary sensor measures the reactive torque on the gearbox. Because several moving parts are required, however, this method always introduces some degree of friction and mechanical noise. As a result, sensors of this type are generally not capable of accurate measurement in low torque ranges.

SUMMARY OF THE INVENTION

Accordingly, the method and apparatus for measuring very small torques developed along a rotating mechanical assembly includes a shaft with a firmly attached platform and a wheel freely rotatable about the axis of the shaft. A first moment arm is attached to the platform; a second moment arm is attached to the wheel and spaced apart from the first moment arm. Between the moment arms is a load cell for generating an electrical signal in response to changes in the spacing between the first and second moment arms. Also attached to the platform and rotating with the torque sensor is electronic signal conditioning circuitry to filter out high frequencies and amplify the signal before it is exported from the rotating shaft. The signal is extracted from the rotating shaft using a slip ring assembly. Torque may be applied between two different longitudinal positions of the shaft such as between the platform and the wheel by means of gearing or a sprocket chain, or, in an alternate embodiment, by means of a second shaft rigidly mounted to the wheel and rotating on the same axis and with the same speed and direction as the first shaft.

The advantage of the present invention is that the signal extracted from the rotating assembly is stronger and more responsive to the torque applied, the signal having been conditioned before being conducted through the slip ring assembly. It is a feature of the present invention that the electrical signal conditioning circuitry is used in combination with the rotating load cell. As it comes from the load cell, the voltage signal is very weak (typically a few millivolts) and at fairly high impedance, making it vulnerable to electrical noise. For this reason, a circuit board providing signal conditioning has been made an integral part of the sensor.

It is also an advantage of the present invention that the load cell is rigidly mounted between the moment arms at some distance from the rotational axis of the shaft, thus, reducing mechanical "give" in the assembly and increasing the leverage of the radial displacement.

Reference is now made in detail to the present preferred embodiment of the invention, an example of which is given in the accompanying drawings.

A BRIEF DESCRIPTION OF THE DRAWINGS

The accompanying drawings, which are incorporated in and form a part of the specification, illustrate the invention and, together with the description, serve to explain the principles of the invention. In the drawings.

DETAILED DESCRIPTION OF THE INVENTION

Figure 1:
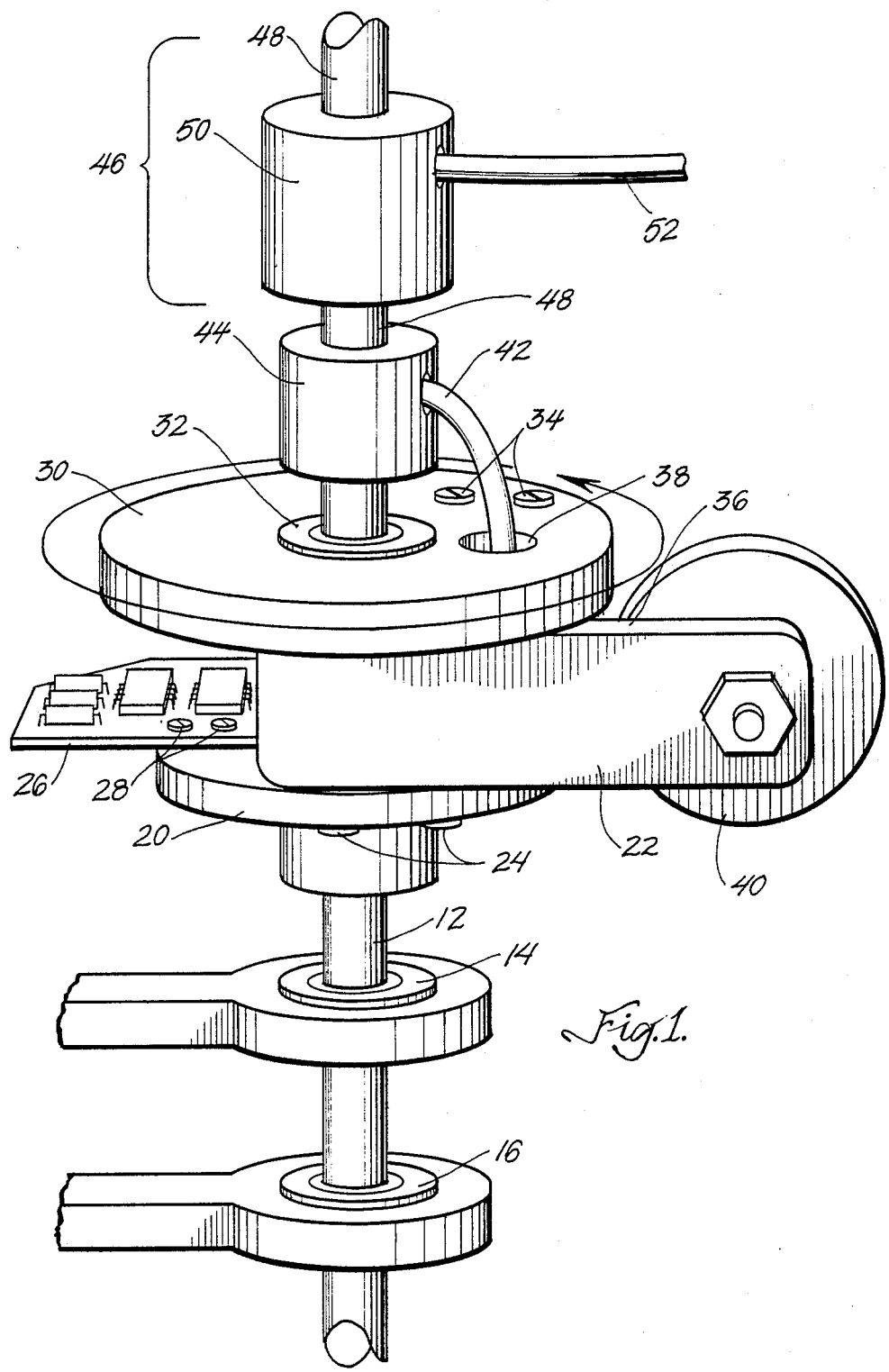
FIG. 1 shows a perspective view of the preferred embodiment of the sensing apparatus.

FIG. 1 shows a torque-sensing assembly 10, according to a preferred embodiment, as viewed in perspective from the side. All components are mounted on a rigid shaft 12, supported by low-friction bearings 14 and 16 preferably mounted in a double shaft hanger 18 or equivalent. Rigidly attached to shaft 12 is a platform 20, which may be a gear, gear blank or other similar device. Typically, platform 20 would either rest directly on bearing 14 or be separated from it by spacers and/or shaft collars (not shown) as necessary to provide proper vertical spacing.

Attached to platform 20 is a moment arm 22, held rigidly in place by screws 24 or other fastening means. Also attached to platform 20 is a circuit board 26, bearing electronic components, further described below, and held in place by screws 28 or other fastening means.

Rotating freely around shaft 12 is a wheel 30, which could be a gear, sprocket wheel or other device of similar form held in place by low-friction bearings 32; preferably these would be narrow-race ball bearings inserted from both top and bottom of wheel 30 to align the axis of rotation with that of shaft 12. Attached to wheel 30, by screws 34 or other fastening means, is a second moment arm 36. Drilled through wheel 30 is a hole 38, dimensioned for the passage of wires therethrough.

Moment arm 22 and moment arm 36 hold between their outer ends a flat, "pancake" type load cell 40, preferably an Entran ELF-500, ELF-1000 or similar model. These cells are available in ranges of 0-1, 0-2, 0-5 and up to 0-1000 pounds in tension, compression, or bipolar (tension plus compression) models; thus, a wide range of applications may be met with no modification in the sensor design. Measured torque is simply the force sensed by cell 40 multiplied by the fixed distance between the main axes of cell 40 and shaft 12.

Because moment arm 22 is rigidly attached to shaft 12 and moment arm 36 is rigidly attached to wheel 30, any opposing torques applied at a first Position A of assembly 10 at moment arm 36 and wheel 30 and a second position B of assembly 10 at shaft 12 and all other parts fixed rigidly thereto create either tension or compression upon load cell 40, depending upon the relative directions of the moment arms 22, 36. Load cell 40 converts a tension or compression to a low-level electrical signal, which is sent to circuit board 26 for processing.

Electrically conducting wires 42 lead from circuit board 26, upward through hole 38 in wheel 30, and into adapter 44 which introduces them into a low-friction slip-ring assembly 46 consisting of hollow shaft 48 and nonrotating housing 50; slip ring assembly 46 may be selected from any of several commercially available assemblies. In slip ring assembly 46, metallic "fingers" in housing 50 slide along rotating rings (not shown) attached to hollow shaft 48, providing electrical continuity between the stationary and rotating parts of the circuit; electrically conducting wires 52 conduct to an external connection.

Figure 2:
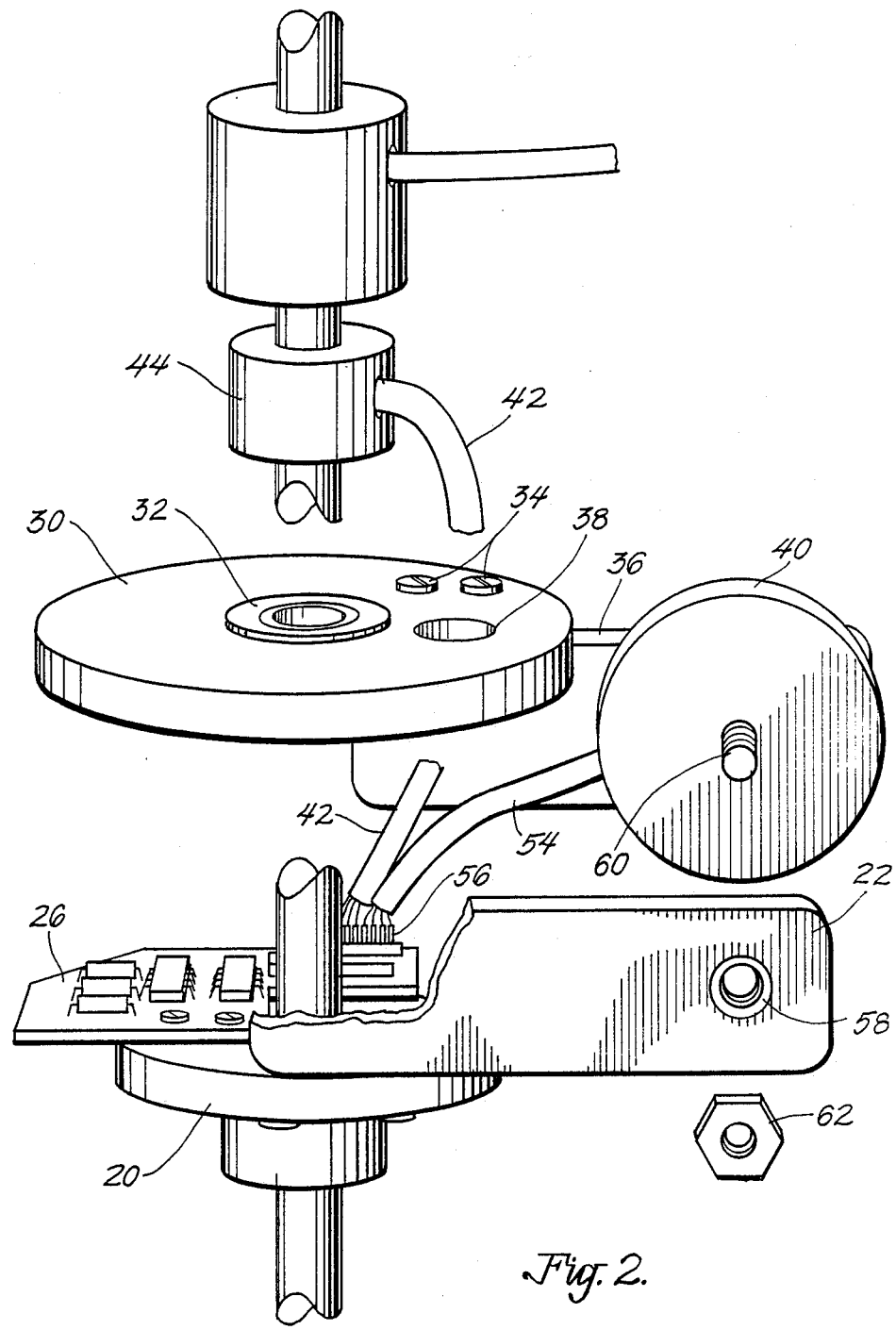
FIG. 2 is an "exploded" perspective view from the same direction, showing details of load-cell mounting.

FIG. 2 gives an exploded, perspective view from the same direction as FIG. 1 and showing the same components. Wheel 30, bearings 32, second moment arm 36 with screws 34, and load cell 40 are shown making up a rigid assembly separate from platform 20, circuit board 26 and first moment arm 22.

First moment arm 22 is shown partly cut away to reveal electrically conducting wires 42 leading from circuit board 26 to adapter 44. Also visible are electrically conducting wires 54 connecting load cell 40 to circuit board 26. Wires 42 and 54 are connected to terminal set 56 on circuit board 26, located approximately below hole 38 in wheel 30. Wires 42 are preferably formed and hole 38 is so located and sized that wires 42 pass through without touching the sides of hole 38.

Load cell 40 is shown detached from moment arm 22. Attachment is by means of hole 58 drilled through the moment arm, stud 60 attached to load cell 40, and nut 62 threaded onto stud 60. Similar attachment (not shown in this Figure) is made between load cell 40 and second moment arm 36.

Figure 3:
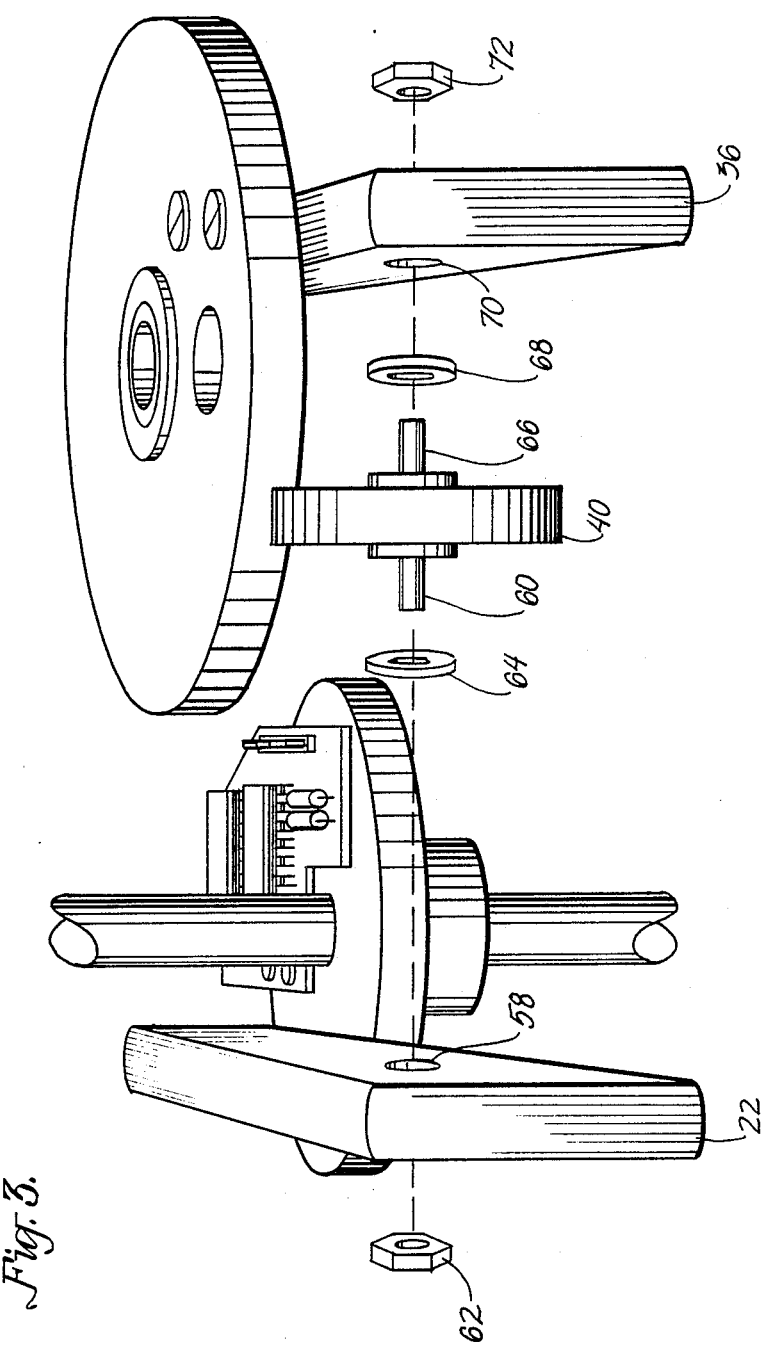
FIG. 3 is a partially "exploded" side perspective view.

FIG. 3 shows a side perspective, exploded view from a different direction than Fig. 2 to show load cell 40. Load cell 40 is mounted by means of stud 60 and washer 64 through hole 58 in first moment arm 22, and nut 62 placed tightening stud 60. Similarly, cell 40 is attached to second moment arm 36 by means of stud 66 attached to load cell 40 through washer 68 and hole 70, and nut 72 placed on the shaft. Nuts 62 and 72 should not be tightened excessivelY so that excess force on load cell 40 is avoided, as such force alters load cell output. Preferably, these nuts are tightened finger-tight only, and are secured against loosening by a small amount of adhesive cementing compound.

Figure 4:
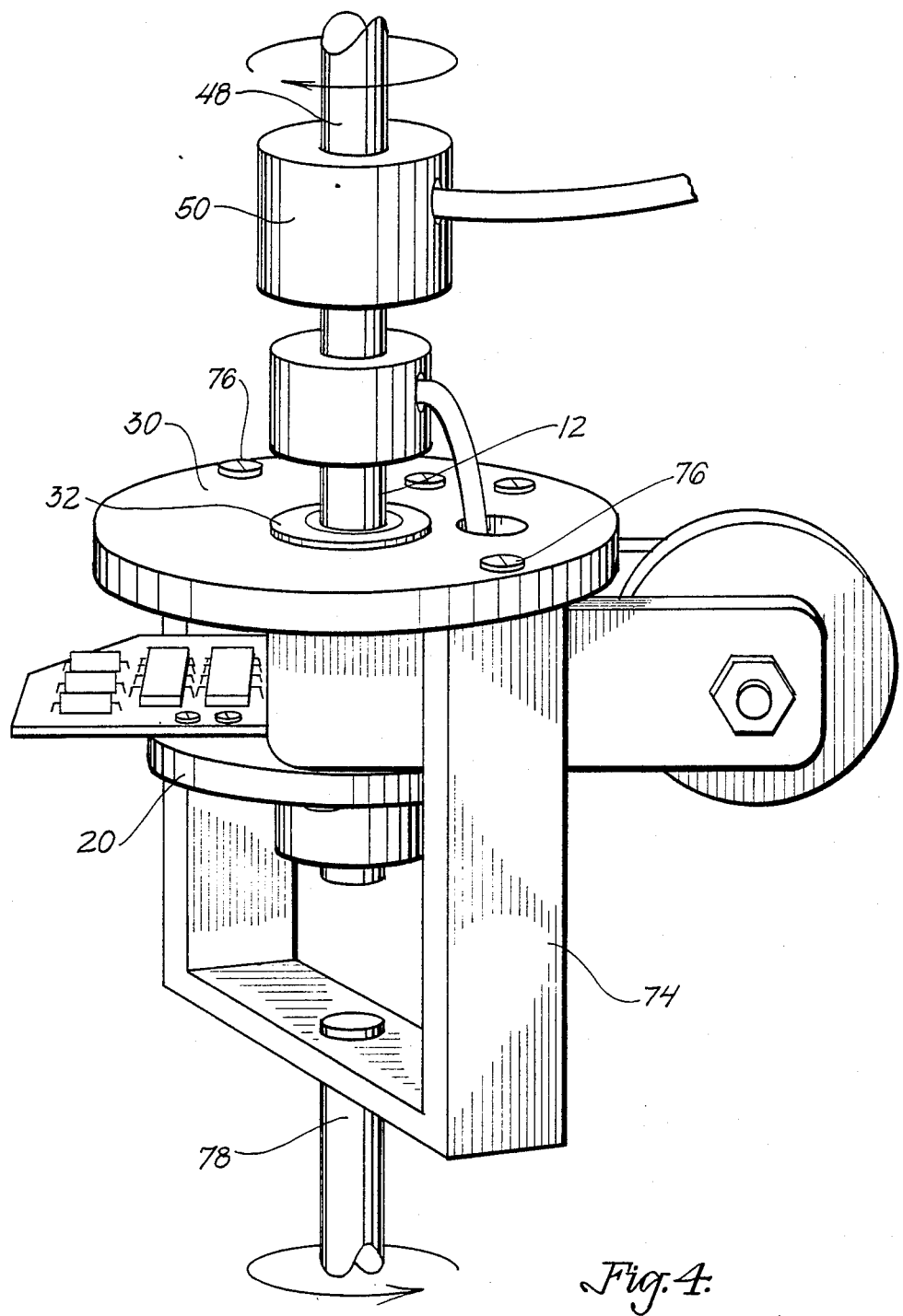
FIG. 4 is a perspective view showing an alternate embodiment.

FIG. 4 shows an alternate mechanical embodiment of sensor 10 for use when connection must be made between two different shafts having the same rotational axis, rather than through a gear or sprocket-chain arrangement. This differs from the arrangement of FIGS. 1, 2, and 3 in that shaft 12, or, alternatively, hollow shaft 48 as shown, continues beyond housing 50 as a single shaft but shaft 12 does not extend appreciably past the base of platform 20 so that bearings 14, 16 are no longer needed. A stirrup 74 is connected to wheel 30 by screws 76 or other fastening means and extends downward to a position below shaft 12 and platform 20, and to which is attached a second shaft 78 coaxial with shaft 12. Torque applied to shaft 12 or hollow shaft 48 is transferred to shaft 78 through platform 20, moment arms 22 and 36, load cell 40, and finally stirrup 74. Bearing 32 must hold wheel 30 very rigidly perpendicular to shaft 12, as any lateral force and any torque not parallel to shaft 12 must be resisted by bearing 32 alone. All other details of construction and operation are the same as previously described.

Figure 5:
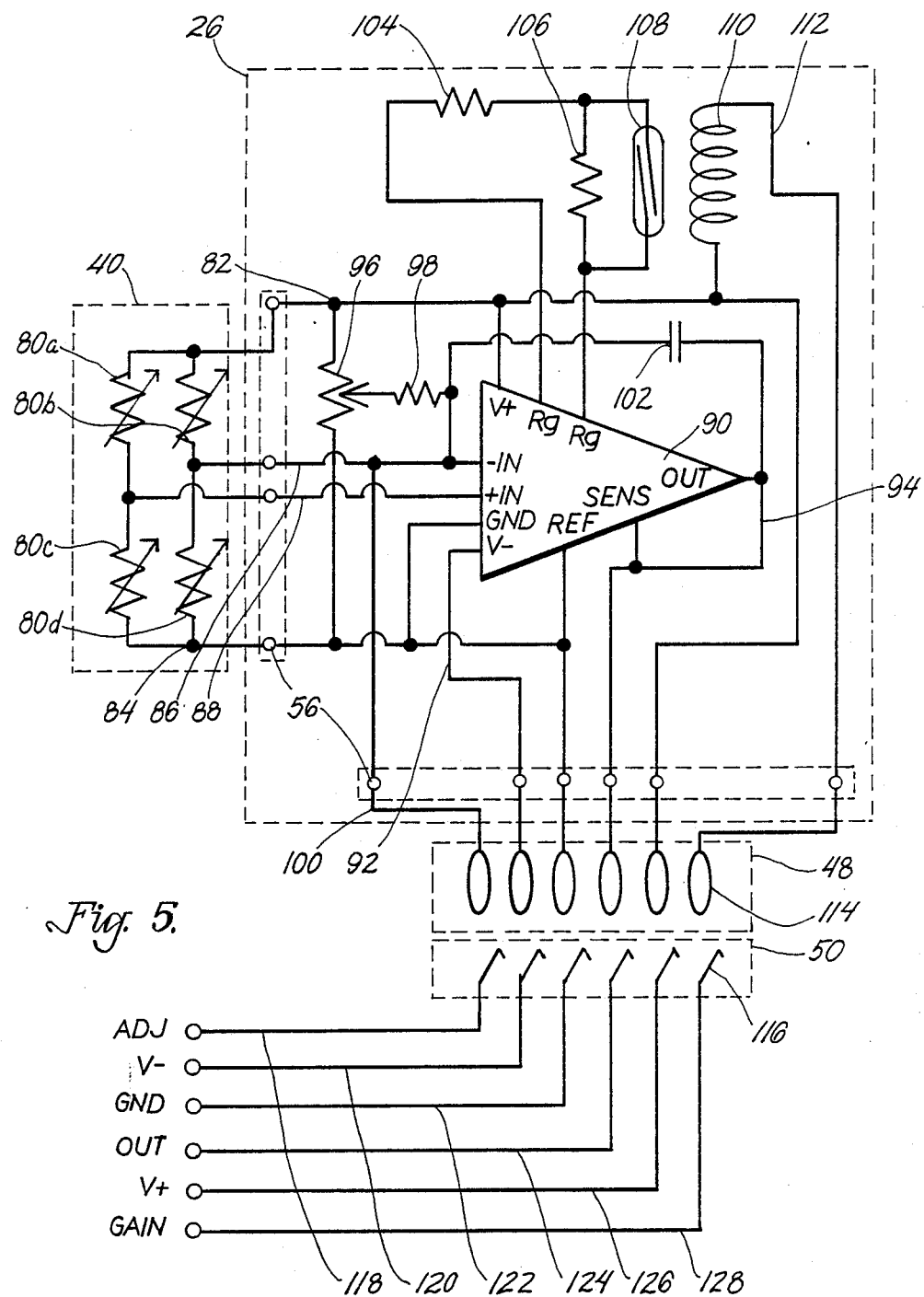
FIG. 5 is an electrical diagram of one embodiment of the present invention showing the signal amplification and conditioning circuitry.

FIG. 5 shows one possible embodiment of the signal amplification and conditioning circuitry located on circuit board 26 and elsewhere on torque assembly 10. Power and other connections between board 26 and slip-ring assembly 46 (itself providing connection away from torque assembly 10), and between board 26 and load cell 40, are made at terminal set 56.

Load cell 40 consists of a nominally balanced bridge formed by variable resistive elements 80a, 80b, 80c, and 80d. When a DC exciting voltage (typically 15 volts) is applied between terminals 82 and 84, current flows in resistive elements 80a, 80b, 80c, 80d resulting in two output voltages at 86 and 88. Force applied to the load cell causes the relative values of voltages at 86 and 88 to change, typically by a few tens of millivolts per pound of force applied and with an impedance of about one thousand ohms.

Voltages at 86 and 88 are fed to the inputs of a miniaturized instrumentation amplifier 90, such as the Analog Devices AD522. This amplifier is powered by positive voltage 82, ground or neutral voltage 84, and, in many but not all amplifier types, also by negative voltage 92. Voltage 84 is also connected to the "REF" or reference input of the amplifier, if present. Direct connection is made between the amplifier output line 94 and the "SENS" or feedback terminal, if present.

A potentiometer 96, connected between voltage 82 and 84 (or, alternatively, between 82 and 92 if present), feeds current through a resistor 98 to one input of amplifier 90; this may be either the "+IN" or "−IN" input. This current permits adjustment of amplifier response at zero torque to any desired value. Also connected to the "+IN" or "−IN" is a line 100 by which an external (nonrotating) potentiometer and resistor (not shown) may be placed in parallel with lines 94 and resistor 96 for more convenient adjustment. A capacitor 102 may be connected between the output of amplifier 90 and the "−IN" input to reduce high-frequency noise via the Miller effect.

Amplifier gain is set by resistor 104 connected between the two "Rg" terminals of the amplifier. Multiple, remotely-selectable gains may be provided by using one or more alternate or supplementary gain resistor 106 which may be switched in or out of the circuit by means of one or more relays or other switching devices 108. A single supplementary resistor 106 and relay 108 are shown, with relay coil 110 directly driven by an outside control line 112, but it will be obvious that many other arrangements are possible.

Power supply line 82, 84, and 92, output line 94, zero adjustment line 100 and gain selection line 112 are connected through terminal set 56 to hollow shaft 48, which bears slip rings 114. Along rings 114 ride flexible metallic fingers 116, enclosed in nonrotating housing 50, by which connection is made between the rotating and stationary parts of the circuitry. Power supply, output, zero adjustment and gain selection lines then continue respectively as line 118, 120, 122, 124, 126 and 128 for connection to outside, nonrotating circuitry.

Monolithic instrumentation amplifier 90 accepts the weak load cell output signals, amplifies them, filters out high-frequency noise, and references the amplified signal to ground. Remotely-switched gain permits stronger amplification of low-end signals. Zeroing may be through an on-board nulling potentiometer and/or through one remotely connected through slip ring assembly 46. The processed, high-level signal is then sent by slip-ring 46 assembly to an external connection.

Typical values for components when in the preferred embodiment are:

80a, 80b: 2000 ohms (approx.) (Inside load cell; 80a, 80b, 80c, 80d not separately accessible to load cell user)
80c, 80d: 600 ohms (approx.)
96: 1000 ohms
98: 10,000 ohms
104: 820 ohms (alone, gives amplifier gain of 245)
106: 7500 ohms (series combination with 104 gives amplifier gain of 25)
110: 250 ohms plus an inductive component The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. An in-line rotating torque sensor, comprising:
   a shaft;
   a platform rigidly attached to said shaft;
   a first moment arm rigidly attached to said platform;
   a wheel freely rotatable about said shaft, the axis of rotation of said wheel coinciding with the axis of rotation of said shaft;
   a second moment arm attached to said wheel;
   a means for generating an electrical signal positioned between and attached to said moment arms, said generating means producing an electrical signal in response to changes in the torque on said shaft; and
   a means for conditioning said electrical signal from said generating means, said conditioning means attached to said platform and in electrical connection with said generating means, said conditioning means having
   an amplifier means for amplifying said electrical signal;
   a means referencing said electrical signal to a condition of zero torque; and
   a means for filtering high frequency noise from said electrical signal.

2. The torque sensor of claim 1 wherein said generating means comprises a load cell.

3. The torque sensor of claim 1 further comprising:
   means for electrically conducting said electrical signal from said conditioning means; and
   a slip ring for receiving said electrical signal from said conducting means and for transferring said electrical signal from said torque sensor.

4. The torque sensor of claim 3 wherein said generating means comprises a load cell.

* * * * *